United States Patent [19]

Dauerer et al.

[11] Patent Number: 5,469,576
[45] Date of Patent: Nov. 21, 1995

[54] FRONT END FOR FILE ACCESS CONTROLLER

[75] Inventors: Norman J. Dauerer, Hopewell Junction; Edward E. Kelley, Wappingers Falls, both of N.Y.

[73] Assignee: International Business Machines Corporation, Armonk, N.Y.

[21] Appl. No.: 35,000

[22] Filed: Mar. 22, 1993

[51] Int. Cl.$^6$ ................................................ G06F 7/00
[52] U.S. Cl. .................... 395/186; 364/DIG. 2; 364/968; 364/969; 364/969.4; 395/442; 395/490; 395/600
[58] Field of Search ........................ 395/725, 325, 395/600, 700, 725; 380/24, 23, 25

[56] References Cited

U.S. PATENT DOCUMENTS

| | | | |
|---|---|---|---|
| 4,588,991 | 5/1986 | Atalla | 340/825.31 |
| 4,652,698 | 3/1987 | Hale et al. | 380/24 |
| 4,672,572 | 6/1987 | Alsberg | 380/23 |
| 4,719,566 | 1/1988 | Kelley | 340/825.34 |
| 4,757,533 | 7/1988 | Allen et al. | 380/25 |
| 4,800,590 | 1/1989 | Vaughan | 380/25 |
| 4,816,658 | 3/1989 | Khandwala et al. | 235/382 |
| 4,882,752 | 11/1989 | Lindman et al. | 380/25 |
| 5,032,979 | 7/1991 | Hecht et al. | 395/575 |
| 5,235,642 | 8/1993 | Wobber et al. | 380/25 |
| 5,263,158 | 11/1993 | Janis | 395/600 |
| 5,276,314 | 1/1994 | Martino et al. | 235/380 |
| 5,349,663 | 9/1994 | Bailey | 395/700 |
| 5,355,474 | 10/1994 | Thuraisngham | 395/600 |
| 5,375,244 | 12/1994 | McNair | 395/725 |
| 5,377,269 | 12/1994 | Heptig et al. | 380/25 |

OTHER PUBLICATIONS

"Securing th Home Fron; SecurePak From Demac Software Help System Managers Safeguard VAX–VMS System"; Steinberg, Jeffrey, Oct. 10, 1988, Full Text Steinberg, Jeffrey Protecting Your VAX Assets Oct. 1, 1990 Full Text.

Primary Examiner—Jack B. Harvey
Assistant Examiner—Ayaz R. Sheikh
Attorney, Agent, or Firm—Dale M. Crockatt; Donald D. Mondul

[57] ABSTRACT

An improved file access controller for a data processing system, and a method for the use thereof, and more particularly, an improved front end system for a file access control system, is described. The improvement is particularly useful for security audits and system maintenance of the file access controller. The improvement comprises an apparatus and method for effecting the steps of retrieving data describing authorized users which is stored within the file access controller, acquiring data describing users which is obtained from at least one other file system, comparing and sorting user data retrieved from the controller with user data obtained from the other file system so as to detect any mismatched data, resolving at least a portion of any mismatches by updating user data from the controller with data obtained from the other file system, combining the matched data and updated data and recording the combined data within the file access controller, and reporting any detected mismatched and non-updated data describing users.

16 Claims, 3 Drawing Sheets

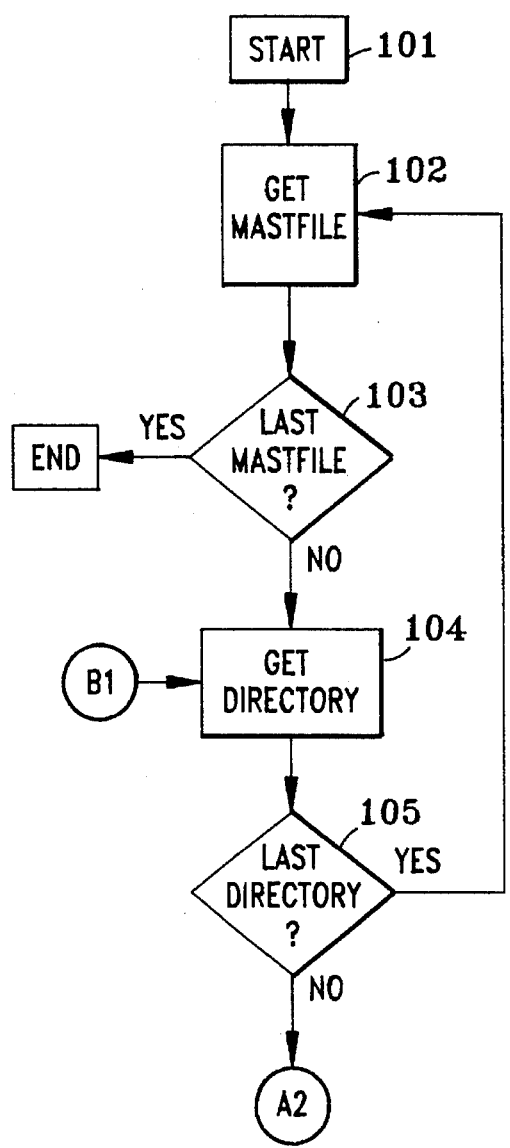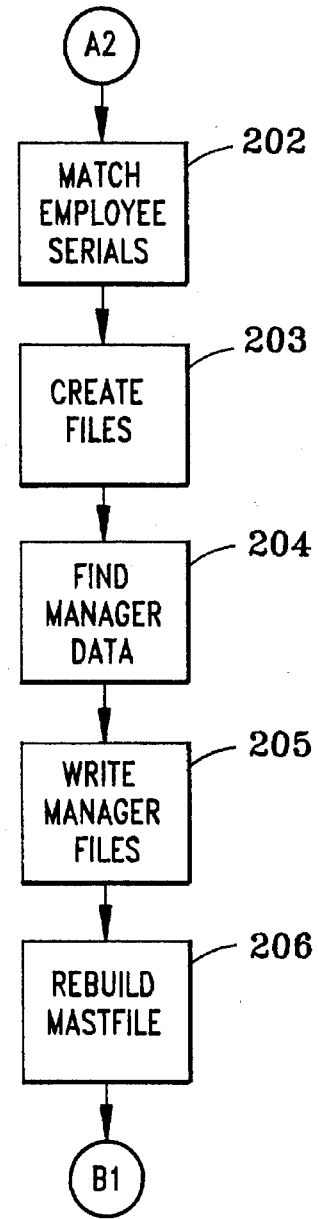
FIG. 2A
| FIG. 2A |
| FIG. 2B |
| FIG. 2C |
| FIG. 2D |
| FIG. 2E |
FIG. 2B

FRONT END FOR FILE ACCESS CONTROLLER

BACKGROUND OF THE INVENTION

1. Field of the Invention

The present invention relates to file access control systems and, more particularly to an improved front end system for a file access control system.

2. Description of the Prior Art

In computer systems, control of access to data and program files is often of critical importance in order to maintain file integrity and to provide security for the information in the files. Control of access to files is particularly important in multi-user systems where a plurality of user terminals are connected to shared or distributed resources, such as memory, and where each terminal is capable of performing as a virtual machine with the entirety of the shared resource resident therein.

Any system for file access control will typically have the capability of regulating access when there is the possibility that a file may be altered so that alterations by one user will not be written over by another user when the file is again stored and to provide each user with only the most recent form of the file. File access systems also will typically have the facility to limit access on a "need to know" basis to limit the files to which a given user may have access, or to limit the type of access which can be granted to a user. For example, a user may be denied access to files for which that user has no particular need or, although a particular user may have need for access to information in the file, that user might not have a need to be able to alter the data in that file. As can be readily understood, the reduction of the number of users having the capability of writing to a file can greatly reduce the likelihood that the file may be inadvertently corrupted or that erroneous information will be introduced into the system.

Efficient satisfaction of the above basic requirements of a file access control system necessarily implies some sort of hierarchical division of the shared resource. Such division of the shared resource might be by subject matter, level of sensitivity and degree of confidentiality, or both, at a plurality of levels. Alternatively, the division could be on the basis of individual files. Whatever the hierarchical division might be, it is necessary that each accessible portion of the shared resource include a list of authorized users and the type of access that each may be granted.

For example, in the Resource Access Control Facility (RACF) system, an IBM corporate product program, the shared resource, although possibly physically distributed, can be conceptualized as a master disk and will be so denominated hereinafter. Groups of files therein are divided by subject matter such as individual products, planning, processes, etc. These groups of files form virtual disks, sometimes referred to as mini-disks, which, for purposes of this description are identified by a number. A list of authorized users must exist for each mini-disk.

It should be understood that while the present invention will be described in terms of the RACF system, it is applicable to any system for controlling file access since the basic requirement for any such system is the maintenance of lists of authorized users corresponding to files in the shared resource.

Division of the shared resource in some manner provides a substantial simplification of the access system requirements. For example, it can be readily understood that each list of authorized users of a portion of the resource may potentially contain an entry for each possible user of the system and which can number in the thousands. Therefore, it is not practical to maintain such a list for each file in the system since the size of the list of authorized users might greatly exceed the size of a substantial number of the files. By the same token, each time there is a change in the data concerning any authorized user, each list of authorized users might potentially require updating. On the other hand, the number of lists cannot necessarily be kept small since the division must be made in such a way as to provide the desired degree of selectivity of access since all files in any division corresponding to a single list of authorized users will be accessible to all users contained in that list. Therefore, the number of divisions, for example mini-disks, of the shared resource might well number in the hundreds, presenting a major burden when the user lists must be altered.

This burden is compounded by the fact that, for security, passwords or user ID's and other information for validating access must be changed from time to time. Also, the statistical likelihood of a change being required will increase with the number of users. Moreover, the requirement for alteration of multiple lists increases the likelihood of erroneous or obsolete information remaining in a list of authorized users of the mini-disk. In the known art, all of these operations must be performed by personnel responsible for management of the database or shared resource, requiring substantial amounts of time and numbers of personnel as well as detailed specialized knowledge of the file access control system. Further, updating the lists of authorized users requires access to the system which may limit use by other users of the system. In addition to the time and personnel required to manage changes to lists of authorized users, the lists must be periodically audited or inspected to assure that erroneous or obsolete information is updated or removed and that security and other operating criteria are satisfied, further increasing the burden.

It should be noted that granting access to a mini-disk typically requires either logging on to the owning user ID or another user ID that has an "alter capability" to the mini-disk. "Alter capability" can only exist for an administrator user ID if the user ID is located on the same node as the owning user ID or if the administrator's user ID node has a "single system image" with the owning user ID. "Single system image" can be thought of as a network of nodes, each having access to all of the disk space in the network. This arrangement can only be put in place for nodes having a close proximity to one another. After logging onto the appropriate user ID, the administrator is required to input specific (e.g. RACF) commands to grant or remove access for each user whose access must be changed.

The RACF commands can be issued either against a single user for a mini-disk or against a group of users for a mini-disk. In the event a RACF command is issued against a list of users, the administrator must keep track of the user ID's to be added or deleted. RACF will take the entire list and either add all the user ID's on the list or delete all the user ID's on the list. If an administrator wants to obtain access or delete access for a user ID for several mini-disks, the administrator must issue the appropriate RACF command for each user ID per mini-disk or group of user ID's per mini-disk.

Thus, for the reasons stated, there is a need for an improved file access controller front end for a data processing system which automates or simplifies the tasks of managing, inspecting, controlling, maintaining, and auditing the data processing system and particularly the file access control system thereof.

U.S. Pat. No. 4,588,991 to Atalla discloses an improved file access security method, and a system embodying the method. The reference does not disclose the automation and simplification of the auditing features or system maintenance features of the present invention.

U.S. Pat. No. 4,672,572 to Alsberg discloses an improved file access security device which monitors communication between one or more terminals and a host computer. The reference does not disclose the automation and simplification of the auditing features or system maintenance features of the present invention.

U.S. Pat. No. 5,032,979 to Hecht, et al., discloses an improved file access security system which monitors access to data files, and records access information in an audit trail. The reference does not disclose the automation and simplification of the auditing features or system maintenance features of the present invention.

U.S. patent application, Ser. No. 07/754,923, entitled "Front End for File Access Control System" (IBM docket number FI9-91-044), filed Sep. 4, 1991 by the inventors herein and assigned to the assignee of the present invention, the disclosure of which is herein incorporated by reference, discloses a file access controller comprising a means for detecting invalid and duplicate access authorizations, a means for denying access to the system which is responsive to detection of any of invalid or duplicate access authorizations, and a means for retrieving data describing authorized users, which data is stored within the file access controller. The reference does not disclose the automation and simplification of the auditing features or system maintenance features of the present invention.

BRIEF SUMMARY OF THE INVENTION

The present invention provides an improved access controller for a data processing system, and more particularly an improved front end system for a file access control system. The improvement comprises a means for retrieving data describing authorized users which is stored within the file access controller, a means for acquiring data describing users which is obtained from at least one other file system, a means for comparing user data retrieved from the controller with user data obtained from the other file system so as to detect any mismatched data, a means for sorting user data retrieved from the controller into sets characterized by data matches and data mismatches, a means for resolving at least a portion of any detected mismatches by updating user data retrieved from the controller with data obtained from the other file system, a means for combining the matched data and updated data and recording the combined data within the file access controller, and a means for reporting any detected mismatched and non-updated data describing users.

ADVANTAGES OVER PRIOR ART

It is an intent of the present invention to provide an improved file access controller front end for a data processing system which automates or simplifies at least one of the tasks of managing, inspecting, controlling, maintaining, and auditing the data processing system and particularly the file access control system thereof.

It is another intent of the present invention to provide an improved front end controller for a file access control system which provides for security audits of the file access control system and simplifies the inspection of or auditing for and correction of errors in data describing authorized users of the controlled access file system, and preferably also the removal of obsolete data.

It is another intent of the present invention to provide an improved control system for a file access control system which will simplify or automate the monitoring and updating of lists of authorized users, and preferably all authorized users.

It is yet another intent of the present invention to provide an improved control arrangement for a file access control system which will automatically monitor and update all lists of authorized users while minimizing the need for updating individual records.

It is yet another intent of the present invention to provide for updating the lists of authorized users without requiring immediate access to the system.

It is yet another intent of the invention to eliminate the need for separate lists for granting access and/or for removing access or for having to indicate on a single list whether a user ID is to be granted access or to have access removed.

It is yet another intent of the present invention to achieve the above-listed objects regardless of the complexity of division of the shared resource which may be established or desired.

Additional uses and advantages of the present invention will become apparent to the skilled artisan upon reading the following detailed description of the invention and the preferred embodiments.

BRIEF DESCRIPTION OF THE DRAWINGS

The present invention will be better understood from the following detailed description of a preferred embodiment of the invention with reference to the drawings, in which:

FIGS. 2A, 2B, 2C, 2D, and 2E are a flow chart further describing operation of the present invention.

DETAILED DESCRIPTION OF THE INVENTION

Figure 1:
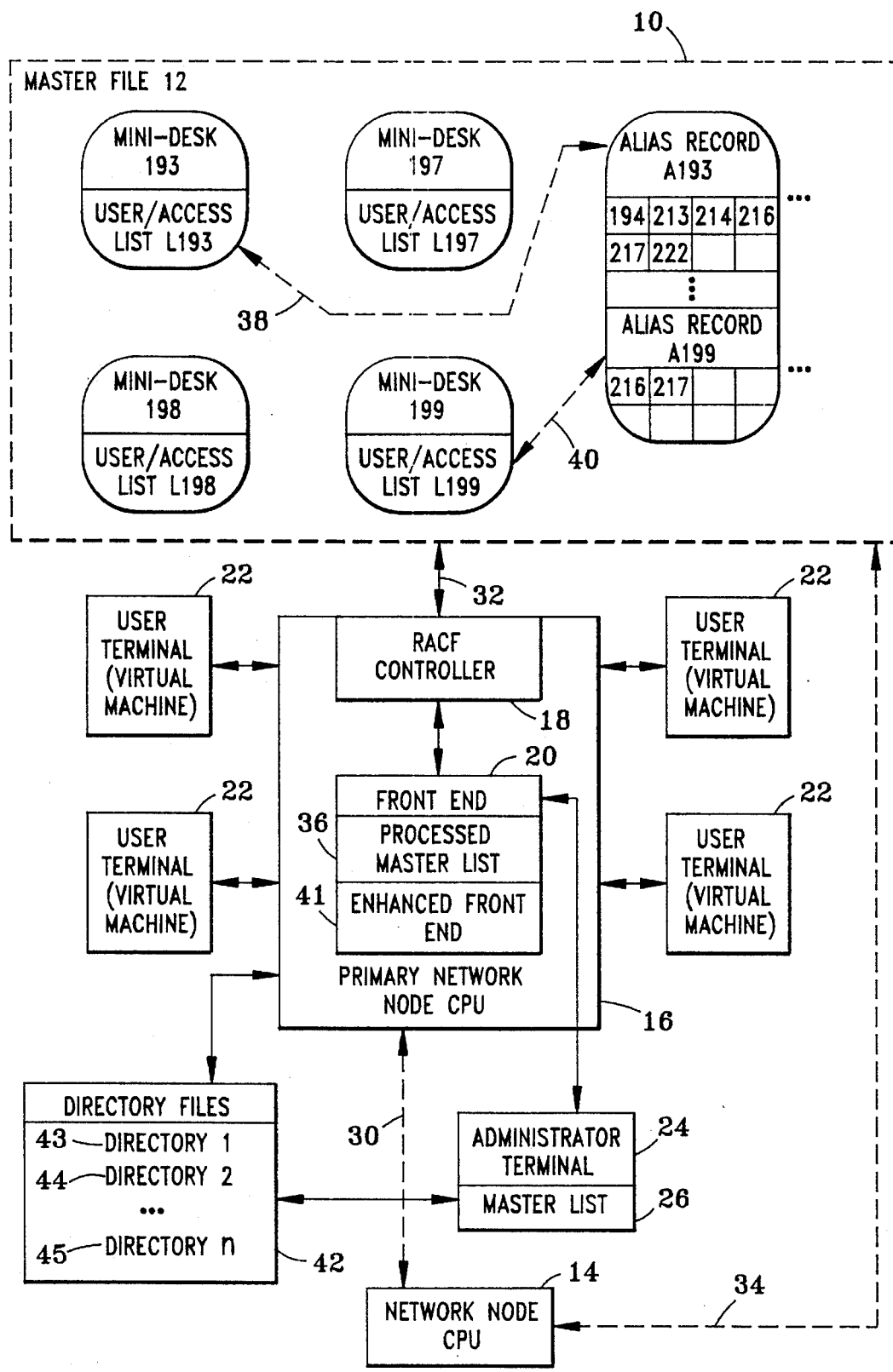
FIG. 1 is a schematic diagram of an exemplary system including a file access controller indicating the use therein of the present invention.

According to the invention an improved access controller system front end is provided.

The following example more particularly describes one embodiment of an improved file access controller front end system for a data processing system which includes an apparatus and method comprising a means for detecting invalid and duplicate access authorizations, a means for denying access to the system responsive to detection of any invalid or duplicate access authorizations, a means for retrieving data describing authorized users which is stored within the file access controller, a means for acquiring data describing users which is obtained from at least one other file system, a means for comparing user data retrieved from the controller with user data obtained from the other file system so as to detect any mismatched data, a means for sorting user data retrieved from the controller into sets characterized by data matches and data mismatches, a means for resolving at least a portion of any detected mismatches by updating user data retrieved from the controller with data obtained from the other file system, a means for combining the matched data and updated data and recording the combined data within the file access controller, and a means for reporting any detected mismatched and non-updated data describing users.

Examples of the various types of data mismatches which may be detected and which may also be resolved include, without limitation, inaccurate data describing authorized or unauthorized users, or incomplete data such as missing attributes of particular authorized or unauthorized users or classes of authorized or unauthorized users. Examples of data or attributes include user employee serial numbers, the manager to which the employee reports, department numbers, user ID's, user nodes, or any other data or attribute which would describe or characterize a user or which would be useful for maintaining a record of users, access occurrences, and so forth. The artisan will also appreciate that numerous other types of data may be processed by the system of the invention. The artisan will further appreciate that the method of the invention is particularly useful for simplifying or automating the acquisition of additional, new information, not previously recorded in the access controller, which is the functional equivalent of comparing to a null field in user data retrieved from the file access controller.

In an alternate embodiment of the invention, the data may be sorted on the basis of the type of mismatch detected between data received from the file access controller and data obtained from the remote file. Examples of the subsets or types of data mismatch categories include which the further sort may be accomplished include further distinguishing the mismatch by department mismatch in comparison to manager mismatch and so forth.

Those skilled in the art will recognize that the sorting step or means may be accomplished by marking or flagging one or more data fields or alternatively by separation of the data such as by copying or moving into separate files.

In another embodiment of the invention, the file access controller front end for a data processing system may additionally include apparatus for storing at least one processed master list (processed MASTLIST) of authorized users corresponding to data in text form in a user access master list in said data processing system to which the data processing system will grant access, and apparatus for updating said processed master list to conform to said master list in text form.

In yet another embodiment of the invention, an access control system for a data processing system, which has at least a portion of a memory arranged as a plurality of mini-disks, is provided including apparatus and method for creating a master list of authorized users of the data processing system, creating a plurality of lists of authorized users for the plurality of mini-disks, at least one list of the plurality of lists corresponding to each mini-disk list, and creating a processed master list from the plurality of lists of authorized users of the mini-disks.

In still another embodiment of the invention, a method of altering access authorization of a data processing system which includes at least a portion of memory arranged as a plurality of mini-disks is provided including the steps of auditing, or inspecting, or updating a master list of authorized users, creating a list of authorized users for at least one mini-disk, and storing the list of authorized users for at least one mini-disk.

In another alternative embodiment, the system of the invention may be adjusted or controlled so as to automatically inspect, audit, or update data upon each requested access to one or more files, thus both compiling an audit trail, and minimizing the amount of system administrator intervention required. This may occur either in real time, or upon a fixed schedule, or upon prompting by the system administrator. Similarly in yet another alternative embodiment, the file access controller may allow access to authorized users, yet accumulate records of data mismatches for later resolution, either upon a fixed schedule, or upon the accumulation of a certain number of data mismatches, or upon prompting from the system administrator.

The skilled artisan will appreciate that the present invention may also be useful in controlling access to various other access controlled levels or subsystems within a data processing system which are themselves subject to limited access. For example, the improved access controller front end may be useful for controlling access to a particular device such as a printer, or a disk drive, or may be useful for controlling access to the entire system, such as during user or administrator log on.

Referring now to the drawings, and more particularly to FIG. 1, there is shown an exemplary system 10 in schematic form indicating the cooperation of the present invention therewith. The overall system includes a master file 12, a plurality of network nodes 14 and a primary network node 16. The primary network node 16 is distinguished from other network nodes 14 primarily by its association with an administrator terminal 24 which may be a dedicated terminal for use by the system administrator but more recently has been constituted by any user terminal 22 on which the administrator has entered his own ID corresponding to his function as system administrator. However, for purposes of this description, it may be useful to conceptualize the administrator terminal as at least a distinct, identifiable terminal. Each of the network nodes 14, including the primary network node 16, will be associated with a plurality of user terminals 22, each operating as a virtual machine with respect to access to master file 12. Access to the master file 12 by the network nodes can be either through the primary network node, as illustrated by dashed line 30 and link 32, or directly, as illustrated by dashed line 34.

In extensive networks such as system 10, it is common to regulate selected portions of the master file 12 with respect to access by individual operators at user terminals 12 under control of some file access control system such as the Resource Access Control Facility (RACF) 18 shown. An example of such an extensive network is the Intersite Line Comparison System (ILC), described in U.S. patent application Ser. No. 07/755,036, entitled "Database System for Intersite Line Comparison" (IBM docket number FI9-91-037), filed Sep. 4, 1991 by the inventors herein and assigned to the assignee of the present invention, the disclosure of which is hereby fully incorporated by reference.

In the prior art, the RACF or other file access control system is under the control and supervision of an authorization administrator. The authorization administrator must access the system in order to exercise control over the RACF and must have detailed knowledge of the RACF.

In the ILC system, which is used to compare production data from widely separated manufacturing sites, there is a need for near-simultaneous access by numerous users to data which is most efficiently stored on a plurality of mini-disks. Therefore, the burden of separate logging on operations and RACF authorizations by the administrator for a number of users to a large number of mini-disks is particularly great.

Furthermore security audits which are required to maintain or inspect the system are particularly burdensome. In a dynamic organization there will be continual changes in departments, managers, and other user attributes. Organizational changes result not only in administrative data changes but also in a change in the type of information people need to access. Security audits are needed to ascertain that the proper level of authorization is granted to a user. On the other hand, administrative data, such as department number, manager, etc., is usually part of personnel data stored on remote virtual disks. Without the ability to obtain the latest, correct, administrative data available for all authorized users of the system, a manual updating or correction of detected mismatched data is required, which is additionally burdensome.

In contrast, the present invention allows for the automated correction of at least part of the administrative data prior to the initiation of the optional reporting capability of this invention. Furthermore, the present invention, implemented as a front end to the RACF, contains the knowledge of the RACF and minimizes or eliminates the need for detailed knowledge of the RACF by the authorization administrator. This is done by using the front end implementation according to the invention to actually perform the manipulations of the RACF or other file access control system. In other words, the invention is used to generate the actual commands needed to properly manipulate the file access system. Doing so in this fashion allows additional utilities to be implemented which are particularly advantageous, as will be discussed below.

In essence, since the invention at the front end of the RACF is able to operate the file access control system, the data concerning authorized user access can be reduced to a single file which can be further manipulated by the automated features of the present invention or alternatively by the authorization administrator. Further, the single file, referred to hereinafter as the master list (MASTLIST) 26, can be kept as a local file. Access to the system to update mini-disk access lists and an existing processed master list 36, reflecting the mini-disk access lists, to correspond to an updated master list 26 can be deferred until such time as access by a user is actually required. For instance, the updating of the master list within the system can be carried out on a regular schedule when user traffic is low and thus avoid conflicts with needs for the system by users. Of course, if the authorization administrator wishes to grant immediate authorization for use of a file, the system must still be accessed. However, even in this case, since the updating is automated by the invention, the system burden is minimized. Once a user has thus been granted access to the system, that user can enter the system and gain access to files as desired, to the limit of the access authorized.

The relationship between the master list 26 and the processed master list 36 has been described in U.S patent application Ser. No. 07/754,923 previously cited. An update operation is done locally to the administrator terminal 24 and stored as a local file at 26. Thereafter, at a convenient time, the master list is processed. The processing of the master list causes the primary network node 16 to first identify all duplicate user identifications. Apparent duplicate user identifications are returned (e.g. reported and displayed or printed out) to the administrator terminal 24 where they can be deleted or otherwise resolved by the system administrator. This feature is important to efficient user authorization since it prevents plural passwords from existing for a single user and which might accumulate only partial authorizations for access to files. The invention does not allow further access to the system until all duplicate user identifications are resolved.

Only when no duplicate user identifications are detected, the invention checks for invalid user identifications. These invalid user identifications might come into existence when an authorization has been terminated in any one of several ways. For instance, a command altering access may be mistyped and not deleted or a user may physically move from one node of the system to another where another user ID may be established. Also, systems such as RACF may continue to keep a user ID as one having previously had access even after the user ID is otherwise removed from the system.

If a user identification is to be invalidated but not properly carried out, the user ID could be carried in the system for extended periods of time, possibly months or years, and presents a substantial security risk. The manner in which invalid user identifications are found is not particularly important to the practice of the invention but could be done, for example, by comparison of access authorization or password change dates, user ID invalidation lists, etc. or a plurality of such user data items. The important fact, from a practical point of view is that any suspected invalid user ID will be reported to the authorization administrator each time the master list is updated and resolution of all suspected invalid user ID's will be required before access is granted to the system. In a preferred form of the invention, however, a transaction is individually carried out against all user ID's in master list 26. Specifically, it is desired to remove invalid user ID's from the master list which could, for example, occur when a user ID is invalidated by some transaction in the system which is not reported to the system administrator and, hence, not reflected in a deletion from the master list 26. Therefore, any invalid user ID which has not been removed from the master list may still be listed in the RACF list of authorized users for a mini-disk. In this case, if a new user ID were to be issued that had the same name as the previously deleted user ID, it would, undesirably, have the same mini-disk access as the previous user. Thus, the preferred form of the invention determines if any user ID's in the master list 26 are invalidated or otherwise not present in the system as reflected in processed master list 36. It should be noted that these transactions constituting this operation remain local to the primary network node and system access is not required.

When no invalid user ID's are detected, the primary network node stores the new master list as processed master list 36 and creates disk lists of users for each mini-disk contained in the master list and communicates these lists to the master file 12 where they are stored in files (e.g. L193, L198) corresponding to the associated mini-disk. It is important to note that all that is required at the primary network node 16 is that the files be sent to processors which hold or own the mini-disks to which access authorization is to be changed whether or not a remote operation is involved.

Referring again to FIG. 1, the enhanced front end 41 at the primary node 16 is invoked with the name of a directory 43 from the list of directory files 42. Additional directories may be invoked for the same MASTLIST since employees existing on different directories may and most likely exist on the same MASTLIST. Each entry on the MASTLIST has at a minimum the user ID and a list of mini-disks for which access is required. The enhanced front end 41 will read each record in MASTLIST that is indicated as being in the directory 43. All records in MASTLIST that do not have a serial number are listed in the blank user ID's (BLANKIDS) report. All records that have a serial are searched in the directory 43 for a match. Any serial numbers not found in the directory 43 are listed in the MISEMPS report. All serial numbers that are found in directory 43 are listed in the MATCHES report. All MATCHES, MISEMPS and BLANKIDS are also placed in a PROCESS report.

Each record in MATCHES are searched in the directory 43 for a pointer the manager record. This is generally a manager serial number in the employee record. The manager serial number should also exist as an employee serial number in directory 43. If the manager is not found as an employee serial number than an entry is made to the MISMGRS report. If the manager's serial number exists on the directory 43 then the manager's serial number, preferred user ID and node is entered in the MASTLIST. For employees whose serial numbers are matched on the MASTLIST and the directory 43, key information such as the employee preferred user ID and node and department number are retrie-ved to be added or updated to the record in MASTLIST. If the department number has changed, then this record is added to the NEWDEPTS report.

All records that are indicated in MASTLIST with a directory other than directory 43 are listed in the REMOVED report. These will be processed in another pass of the enhanced front end.

After completion of this part of the enhanced front end, the numbers of records in all reports are presented so that integrity of the searches may be verified. The records of the MATCHES plus MISEMPS plus REMOVED plus BLANKIDS are listed so that they may be compared to the total records in MASTLIST. These totals will be equal in a system that has data integrity. The records of MATCHES plus MISEMPS plus BLANKIDS must equal the PROCESS records.

It should be noted that this processing has checked the integrity of the directory 43 with regard to the reference to the manager serial number on the employee record.

The next function of the enhanced front end is to do an audit of all employees and authorizations by department. All employee records are grouped by the department number which is indicated in MASTLIST. Records that have no department number are listed in MISDPTS report. Records that have missing manager user IDs or nodes are listed in MISMGRS report. Items in MISDPTS and MISMGRS report indicate inaccuracies with the directory 43. This is another example of the validation of the directory when invoking the invention. If a group of records that have the same department number have different managers listed or the same manager with a different address the enhanced front end will look for the greatest number of instances of the same manager, manager user ID and node and use this as the correct address to send the audit report for the department.

If not a single manager is listed in each of the department employee records then a NOADDRES report is updated to reflect a department with not a single manager listed in any of the individual records. Finally all of the department audit reports are distributed and the REPTCNT report is updated with an entry that lists the manager, manager node and user ID and the number on employees in the department listed on MASTLIST and distributed as a department audit.

The following example more particularly describes the system and method of the invention.

EXAMPLE 1

In this embodiment, the master list 26 is a matrix of data. The improved front end system uses a remote directory to add employee and manager information to the matrix of authorized users and disks. There may be more than one directory for each matrix and there may be more than one matrix for a data base system.

The key data value from the authorization list is the employee serial number which is used to obtain data describing the employee department, manager department, manager serial number, employee electronic address, the manager electronic address and the manager name. This information is automatically placed on the authorization list which gives and accurate list of employees by department and manager. This information is used to automatically generate a list of access occurrences by employee and by department which is used as a security audit of employees and the disks they are allowed to see.

Since this is a search of serial numbers on a directory of a dynamic organization there will be many changes in departments and managers each time the updating system is run to compare the master list to data obtained from the employee directory. Errors may be produced because of errors on the directory. The following is a list of files that are produced that will indicate all possible changes to organization and all possible error conditions as a result of errors on the directory. The data within the files is of a type that makes it easy to account for all changes in the organization and to take corrective action for all error conditions. The following files will be produced:

BLANKID

This is a list of user IDs on the master list 26 (MASTLIST) whose employee serial numbers are blank. No search can be made in the employee directory.

MATCH

This file contains only the matches on the serial search of the employee directory.

MISEMPS

This file contains only the mismatches on the serial search of the employee directory for employee serial numbers.

MISMGRS

This file contains only the mismatches on the serial search of the employee directory for manager serial numbers.

NEWDEPT

This file contains a list of all user IDs whose departments have changed.

PROCESS

This file contains a list of all user IDs used in the comparison step between the master list and the employee directory file.

REMOVED

This file contains a list of all user IDs NOT used in the comparison step between the master list and the employee directory file.

MASTER LIST (MASTLIST)

This is an expanded data file including the serial number, node and user ID of the employee who owns the user ID and the employee's manager's serial number node and user ID.

When the audit is automatically generated, files are created to indicate the results of the audit as well as to show where there is missing information.

MISDPTS

This file contains a list of items from mastlist that do not have department numbers indicated.

MISMGRS

This file contains a list of items from mastlist that have missing managers nodes or user IDs.

REPTCNT

This file contains a list of all departments, managers nodes and user IDs and the number of employees in a department to which is sent an audit note.

NOADDRES

This file contains a list of departments from the mastlist that do not have a single manager listed. These departments could not be sent an audit note. The note files for these departments are left on the "A" disk. The file name is the department number and the file type is "D".

Having described the file names used in the example, the operation of the invention is more particularly described by referring to the flowchart shown in the Figures. Referring particularly to FIG. 2A, the steps of the method and the schematic elements of the system are shown. Taking each, in order, there is shown:

Operation 101: Start

Operation 102: Get MASTLIST. Read the appropriate master list authorization file. There may be several mastlists that are used to grant authorizations to the same system. Each mastlist addresses a portion of the authorizations. The only reason for several mastlists is that different people may want to control authorizations for different parts of the data base. A table controls which mastlists are allowed to make authorizations for each data base system.

Operation 103: Last MASTLIST? Is this the last mastlist for the data base system?

Operation 104: Get directory. Get the appropriate directory for the mastlist. Identify the fields for the directory. Make a subset of the directory containing the fields that will be used. Create a PROCESS file of all of the user IDs from the mastlist that have the indicated directory. Create a REMOVED file that contain all of the user IDs from the mastlist not used on the current directory.

Operation 105: Last directory. Is this the last directory that is indicated in the mastlist?

If the last directory is not detected by operation 105, then the system begins or continues the comparison of data received from the controller and contained in the mastlist with data obtained from the remote directory. Referring to FIG. 2B, the steps of the method and the schematic elements of the system are shown. Taking each, in order, there is shown:

Operation 201: Match employee serials. Match the user IDs from mastlist with the subset of the directory. Update key employee employee and department information on mastlist. The information includes nodes, user IDs, department number, manager serial number and whether the employee is manager which is indicated by the manager indicator. List all of the department numbers that have changed since the last update. List all of the serial numbers found in mastlist and not in the directory. List all of the blank serial numbers on mastlist.

Operation 202: Create files. Create a MATCH file of all of the matches between the mastlist and the directory. Create a MISEMPS file of the serial numbers found on mastlist and not in the directory. Create a BLANKIDS file of all of the blank serial numbers on mastlist. Create a NEWDEPT file of all of the employees that have changed departments since the last update.

Operation 203: Find manager data. Get the manager data such as node, user ID and department on the directory. The key to find the manager is the serial number that is referenced in the employee record. This information is used to find the manager information as an employee. Store the managers serial numbers not found in the directory.

Operation 204: Write and manager files. Create the MISMGRS file for manager serials not listed as employees on the directory. Create the BLKMGRS file for managers not listed on mastlist.

Operation 205: Rebuild files. Rebuild the mastlist to contain all of the information not found on the directory and for missing employee serial numbers. Add to a new mastlist all of the matches, employees not found on the directory, manager serial numbers not on the directory, user IDs with manager serial numbers not on original mastlist, blank employee serial numbers and employees referenced on mastlist as being on other than the current directory.

Figure 2C:
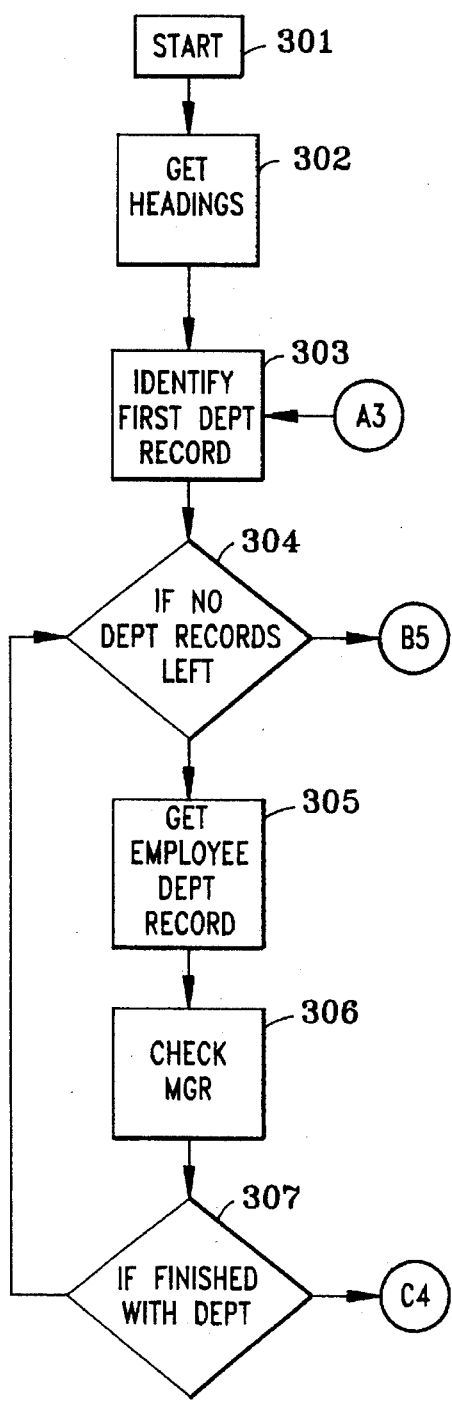

After rebuilding the mastlist in operation 205, the system begins the reporting of any detected and non-updated data. Referring to FIG. 2C, the steps of the method and the schematic elements of the system are shown. Taking each, in order, there is shown:

Operation 301: Start. Start the notification portion of the system.

Operation 302: Get headings. Set up the headings for the output reports.

Operation 303: Identify first department record. Identify the first department to be processed.

Operation 304: If no department records left. Are there any more departments left to process?

Operation 305: Get employee department record. This is a record for an employee with a user ID. There may be several records for the same employee each with a separate user ID. We need get only one such record for each employee.

Operation 306: Check manager. Check if there is a manager indicated on the employee record.

Operation 307: If finished with department? Have we processed all of the employees in the department?

Figure 2D:
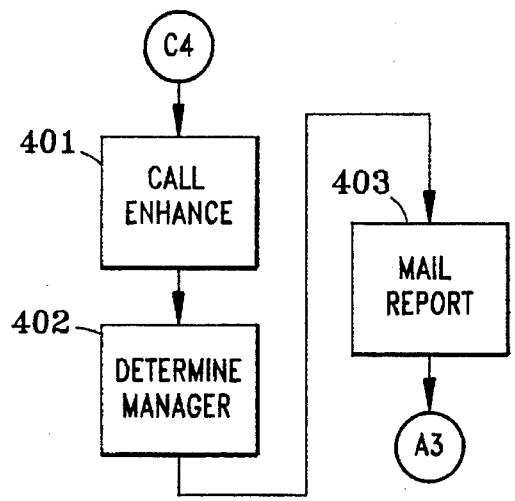

Referring now to FIG. 2D, there is shown:

Operation 401: Call ENHANCEMENT. Call a prebuilt file that contains the words to describe the audit note and the list of applications that are for each mini-disk referenced on the mastlist. This includes the alias file of mini-disks referenced on the d00009 alias file.

Operation 402: Determine manager. There may be different managers referenced on the employee records for each department. If this is the case then assume an error and select the manager that occurs most frequently on the employee records for a department.

Operation 403: Mail Report. Mail the report to the department manager.

Figure 2E:
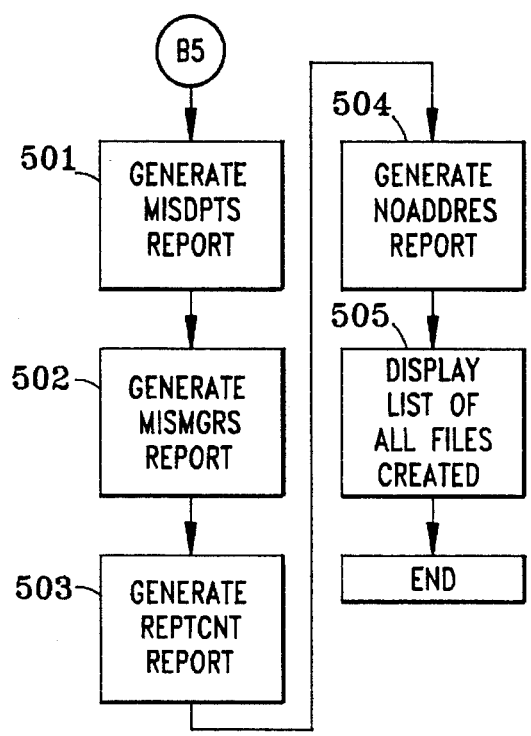

Referring now to FIG. 2E, there is shown:

Operation 501: Generate MISDPTS report. This is a list of records on the mastlist that do not have department numbers indicated.

Operation 502: Generate MISMGRS. This is a list of records on the mastlist that have missing managers, manager nodes or user IDs.

Operation 503: Generate REPTCNT. This is a list of all departments that have been sent the audit note. It includes the managers nodes, user IDs and the number of employees in the department that have been sent the note.

Operation 504: Generate NOADDRES report. A list of all departments on mastlist that do not have a single manager listed. These departments could no be sent an audit note.

Operation 505: Display a list of all of the files created. This will display a list of all of the reports created including notes that were created.

The example describes only one known best embodiment, many other variations are possible. Upon a reading of the present disclosure, it will be apparent to the skilled artisan that other embodiments of the present invention beyond those embodiments specifically described herein may be made or practiced without departing from the spirit of the invention. Similarly, changes, combinations and modifications of the presently disclosed embodiments will also become apparent. The embodiments disclosed and the details thereof are intended to teach the practice of the invention and are intended to be illustrative and not limiting. Accordingly, such apparent but undisclosed embodiments, changes, combinations, and modifications are considered to be within the spirit and scope of the present invention as limited solely by the appended claims.

What is claimed is:

1. An improved access controller front end for use with an access controller in a data processing system; the access controller front end comprising:

means for detecting invalid and duplicate access authorizations;

means for denying access to said data processing system responsive to detection of any of said invalid or duplicate access authorizations;

means for retrieving data describing authorized users of said data processing system, which data is stored in a first file system within the access controller;

means for acquiring data describing authorized or unauthorized users of said data processing system, which data is obtained from at least one second file system, said at least one second file system being communicatively coupled with said data processing system;

means for comparing data retrieved from the controller describing authorized users with data obtained from said at least one second file system describing authorized or unauthorized users, so as to detect any matched data and mismatched data;

first means for sorting data cooperating with said means for comparing data, said means for sorting data sorting said data retrieved from the controller describing authorized users into at least a first set of sorted data and a second set of sorted data, said first set of sorted data relating to said matched data, said second set of sorted data relating to said mismatched data;

means for resolving at least a portion of any detected mismatches by updating data in said second set of sorted data with data obtained from said at least one second file system; and means for combining the matched data describing authorized users with the updated data describing authorized users, and recording the combined data within the access controller.

2. The improved access controller front end according to claim 1 wherein access to at least one data file system is controlled.

3. The improved access controller front end according to claim 1 wherein the first means for sorting data retrieved from the controller describing authorized users into at least a first set of sorted data and a second set of sorted data further comprises a second means for sorting said data mismatches into a plurality of subsets according to a mismatch type.

4. The improved access controller front end according to claim 1 further comprising a means for reporting cooperating with said means for resolving, said means for reporting indicating any said detected mismatches not updated by said means for resolving.

5. The improved access controller front end according to claim 4 wherein said means for reporting any detected mismatched and non-updated datadescribing authorized users further comprises a first means for transmitting a plurality of reports to a remote user.

6. The improved access controller front end according to claim 5 further comprising a second means for sorting any said detected mismatches not updated by said means for resolving into a plurality of subsets according to a mismatch type and a second means for transmitting a plurality of reports to at least one remote user, wherein reports are distinguished according to said mismatch type.

7. The improved access controller front end according to claim 1 wherein the means for recording the combined data within the access controller further comprises a means for recording a master list of authorized users of said data processing system.

8. The improved access controller front end according to claim 1 wherein the said mismatched data is further identified as incomplete data or data having null data fields included in the user data retrieved from the controller.

9. The improved access controller front end according to claim 1 wherein said data processing system further comprises a memory arranged as a plurality of mini-disks, and wherein said access controller front end further comprises:

a means for confirming a master list of authorized users of said data processing system;

a means for creating a plurality of lists of authorized users for said plurality of mini-disks from said master list, at least one list of said plurality of lists corresponding to each mini-disk; and a means for creating a processed master list from said plurality of lists of authorized users of said mini-disks.

10. An improved apparatus for use in a data processing system having a plurality of system loci for updating a designated remote file system at a remote system locus of said plurality of system loci in said data processing system with data from a local file system at a local system locus of said plurality of system loci in said data processing system describing authorized users of said data processing system comprising:

means for retrieving data describing authorized users of said data processing system, which data is stored in said local file system;

means for acquiring data describing authorized or unauthorized users of said data processing system, which data is obtained from at least one remote system locus of said plurality of system loci;

means for comparing data retrieved from the local file system describing authorized users with data obtained from said at least one remote system locus describing authorized or unauthorized users, so as to detect any matched data and mismatched data;

means for sorting data cooperating with said means for comparing data, said means for sorting data sorting said data retrieved from the local file system describing authorized users into at least a first set of sorted data and a second set of sorted data, said first set of sorted data relating to said matched data, said second set of sorted data relating to said mismatched data;

means for resolving at least a portion of any detected mismatches by updating data in said second set of sorted data with data retrieved from the local file system; and means for combining the matched data describing authorized users with the updated data describing authorized users, and recording the combined data within said designated remote file system.

11. An improved method for use with an access controller in a data processing system for controlling access to said data processing system; the method comprising the steps of:

detecting invalid and duplicate access authorizations; denying access to said data processing system responsive to detection of any of said invalid or duplicate access authorizations;

retrieving data describing authorized users of said data processing system, which data is stored in a first file system within the file access controller;

acquiring data describing authorized or unauthorized users of said data processing system, which data is obtained from at least one second file system, said at least one second file system being communicatively coupled with said data processing system;

comparing data retrieved from the controller describing authorized users with data obtained from said at least one second file system describing authorized or unauthorized users, so as to detect any matched data and mismatched data;

sorting data in connection with said comparing data, said sorting data effecting sorting of said data retrieved from the controller describing authorized users into at least a first set of sorted data and a second set of sorted data, said first set of sorted data relating to said matched data, said second set of sorted data relating to said mismatched data;

resolving at least a portion of any detected mismatches by updating data in said second set of sorted data with data obtained from said at least one second file system;

combining the matched data describing authorized users with the updated data describing authorized users, and recording the combined data within the file access controller; and reporting any said detected mismatches not updated by said resolving.

12. The improved method according to claim 11 wherein the step for reporting any said detected mismatches not updated by said resolving further comprises the step of transmitting a plurality of reports to a remote user.

13. The improved method according to claim 11 wherein the step for sorting data retrieved from the controller describing authorized users into said first set of sorted data and said second set of sorted data further comprises the step of further sorting said mismatched data into subsets according to a mismatch type.

14. The improved method according to claim 11 wherein the step for recording the combined data within the file access controller further comprises the step of for recording a master list of authorized users of said data processing system.

15. The improved method according to claim 11 wherein the said mismatched data is further identified as incomplete data or data having null data fields included in the user data retrieved from the controller.

16. The improved method according to claim 11 wherein said data processing system further comprises a memory arranged as a plurality of mini-disks, and wherein said method for controlling access to a data processing system further comprises the steps of:

confirming a master list of authorized users of said data processing system;

creating a plurality of lists of authorized users for said plurality of mini-disks from said master list, at least one list of said plurality of lists corresponding to each mini-disk; and creating a processed master list from said plurality of lists of authorized users of said mini-disks.

* * * * *